United States Patent [19]

Weber

[11] Patent Number: 4,576,024

[45] Date of Patent: Mar. 18, 1986

[54] DEVICE FOR BLOCKING THE ROTARY MOVEMENT OF A STEERING COLUMN IN A MOTOR VEHICLE

[75] Inventor: Günter Weber, Wuppertal, Fed. Rep. of Germany

[73] Assignee: Neimann S.A., Courbevoie, France

[21] Appl. No.: 563,398

[22] PCT Filed: Apr. 2, 1983

[86] PCT No.: PCT/EP83/00098
§ 371 Date: Dec. 2, 1983
§ 102(e) Date: Dec. 2, 1983

[87] PCT Pub. No.: WO83/03580
PCT Pub. Date: Oct. 27, 1983

[30] Foreign Application Priority Data

Apr. 14, 1982 [DE] Fed. Rep. of Germany ....... 3213719

[51] Int. Cl.[4] .............................................. B60R 25/02
[52] U.S. Cl. ....................................... 70/252; 70/186
[58] Field of Search ................................. 70/182-186, 70/245, 252

[56] References Cited

U.S. PATENT DOCUMENTS

| 1,348,802 | 8/1920 | Jensen | 70/245 |
| 1,363,285 | 12/1920 | Stabler | 70/252 |
| 1,363,676 | 12/1920 | Schwemmer | 70/183 |
| 1,394,872 | 10/1921 | White | 70/183 |
| 1,452,879 | 4/1923 | King | 70/221 |
| 2,964,935 | 12/1960 | Lombardi | 70/252 |
| 3,400,563 | 9/1968 | Lempke et al. | 70/252 X |

FOREIGN PATENT DOCUMENTS 337444 10/1930 United Kingdom ................. 70/186

*Primary Examiner*—Robert L. Wolfe
*Attorney, Agent, or Firm*—Karl F. Ross; Herbert Dubno

[57] ABSTRACT

The invention relates to a device for blocking the rotary movement of a steering column (1) in a motor vehicle by means of a blocking bolt (5) which is actuated by a lock and in the blocking position engages in a recess (4) in the steering column. At least one further blocking bolt (6) is provided which can be actuated by the same lock and, like the first blocking bolt (5), in the blocking position engages in recesses (4) arranged at regular spacings around the periphery of the steering column. Material located between the recesses (4) forms, as protrusions (3), side faces (Z) for blocking the blocking bolts (5, 6).

20 Claims, 14 Drawing Figures

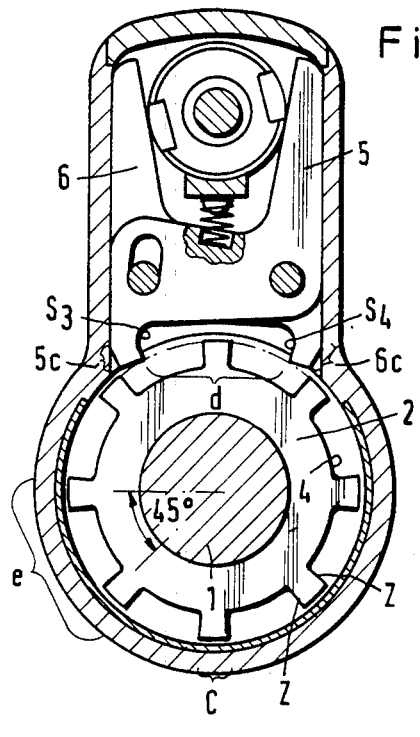
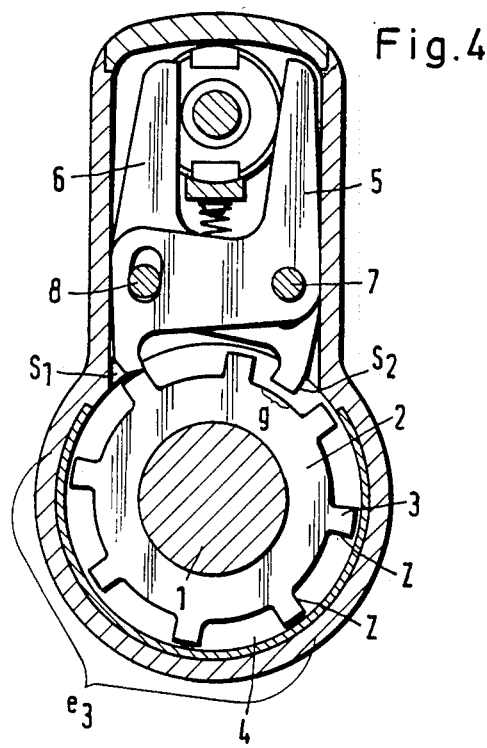
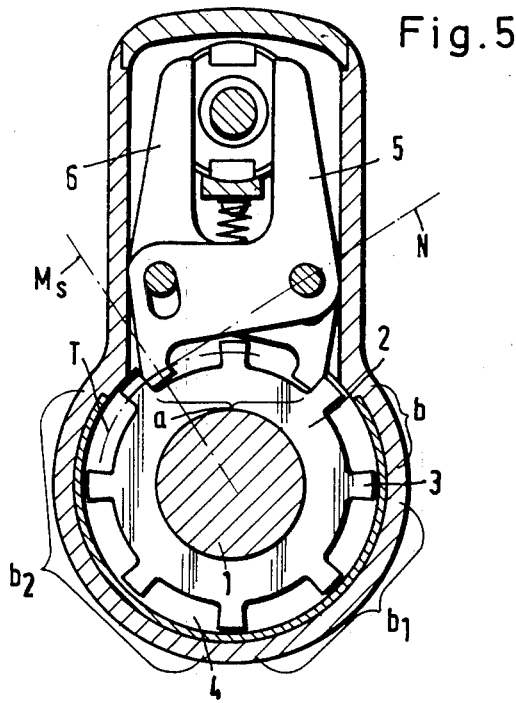
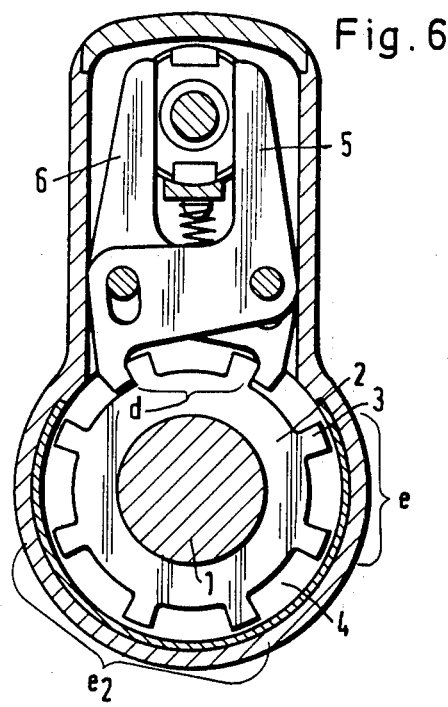

DEVICE FOR BLOCKING THE ROTARY MOVEMENT OF A STEERING COLUMN IN A MOTOR VEHICLE

The invention relates to a device for blocking the rotary movement of a steering column in a motor vehicle by means of a blocking bolt which is actuated by a lock and in the blocking position engages in a recess in the steering column.

It is known to prevent rotation of a steering column by means of a radial bar-shaped blocking bolt. These blocking bolts are moved by conventional steering locks, the blocking bolt dropping into a recess in a socket located on the steering column, after the key has been fully withdrawn. After withdrawal of the key, the front end of the blocking bolt then rests on the socket until the recess in the socket has been reached by rotating the steering wheel. The blocking bolt then drops into the recess under spring action.

As long as the block bolt has not dropped in, the vehicle is steerable to a limited extent. Moreover, while the blocking bolt has not dropped in, the steering wheel can be rotated by an unauthorised person with such force that, in particular due to the inertial mass (or even an additional inertial mass), the blocking bolt can be sheared off. The blocking bolt which has not dropped in can also be held back by manipulation, so that the vehicle becomes steerable without restriction.

It is the object of the invention to improve a device of the type set forth above, in such a way that, when the steering lock has been locked, blocking of the rotary movement occurs in any position of the steering column. A further object of the invention is to provide a device of the type set forth above, which is of small construction in the radial and axial directions relative to the steering column.

These objects are achieved according to the invention when at least one further blocking bolt is provided which can be actuated by the same lock and, like the first blocking bolt, in the blocking position engages in recesses arranged at regular spacings around the periphery of the steering column, the material located between the recesses forming, as protrusions, side faces for blocking the blocking bolts.

After the key has been withdrawn, this blocking device always leads to at least one of the two blocking bolts dropping in, without the steering wheel having to be rotated after withdrawal of the key. Depending on the desired force input, two or more blocking bolts can be provided.

Particularly advantageous embodiments of the invention are indicated in the sub-claims. These embodiments show, inter alia, the following advantages:

small dimensions in the radial and axial directions
if only one blocking lever should have dropped in, the second blocking lever will drop in immediately after the steering wheel has been rotated by only a few degrees of angle.

The recesses in the steering column can be larger than the width of the blocking bolts, and also larger than the width of the material (protrusions, teeth) located between the recesses, so that there is little remaining protruding area on which blocking bolts can seat before they block, so that the chance of non-blocking seating is reduced.

The arrangement of blocking bolts in only one plane at right angles to the steering column few components
simple assembly
simple manufacture
reliable functioning
easy and comfortable handling; in particular, no forces generated by the steering column and acting on the steering lock have to be overcome
low wear
versatile connections due to the blocking bolts
feasibility of manufacturing most of the components from a lower strength metal or plastic, in particular the blocking bolts and the components adjacent to the blocking bolts, especially a socket, tube or ring which are seated on the steering column and form the protrusions
low weight Production of the blocking bolt and those parts on the steering column which interact with the blocking bolt is particularly advantageous, since the number of the blocking bolts and/or the length of the blocking bolts in the direction parallel to the axis of the steering column can be large, so that the forces acting thereon can be favourably distributed and absorbed.

Illustrative embodiments of the invention are represented in the drawings and are described in more detail below. In the drawings:

FIGS. 3 to 6 show sections according to FIG. 1, with different positions of the blocking bolts;

Figure 1:
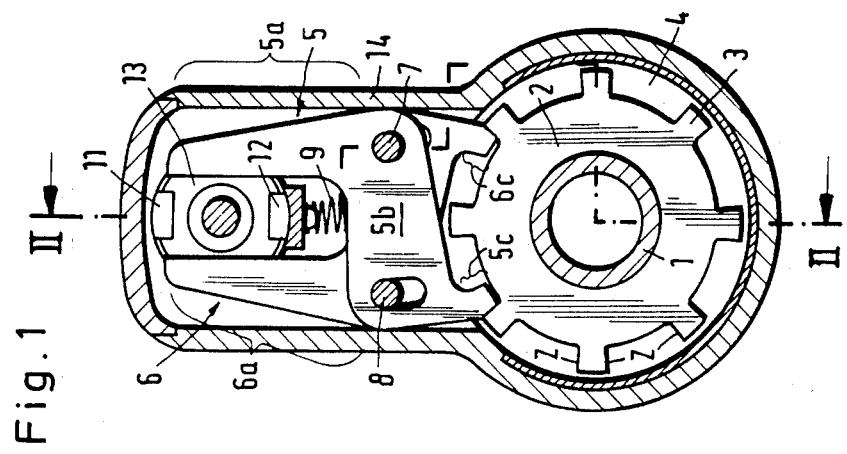
FIG. 1 shows a cross-section through the steering column at the height of the blocking device, along I—I in FIG. 2.

A coaxial bush 2 which carries 8 axial rib-shaped protrusions on its cylindrical periphery is welded to a tubular steering column 1 in a motor vehicle. The center planes running through the protrusions 3 and the axis of the steering column form mutual angles of 45 degrees. Each rib-shaped protrusion 3 has two radial side faces Z which at the same time form the interspaces between the protrusions 3, these interspaces being termed recesses 4 in the text which follows. The protrusions 3, which can also be called teeth, have, in the peripheral direction of the bush 2, a width c which corresponds to one third of the width b of the recess 4 in the peripheral direction. The arc length of the recess 4 at the height of the part circle T is thus three times the arc length within the protrusion 3 at the height of the part circle T.

Two elbow shaped levers as blocking bolts 5, 6 are hinged on laterally next the steering column 1, the two levers being located relative to one another to tilt symmetrically to a radius of the steering column, and the hinge axis 7 of the first blocking bolt 5 being at the same distance from the steering column 1 as the hinge axis 8 of the second blocking bolt 6. Planes running through the two hinge axes 7 and 8 an the steering column axis form an angle of 38 degrees with one another.

Each blocking bolt forms essentially three regions, namely a first region 5a, 6a through the region which is remote from the steering column 1 and is displaced relative to the steering column approximately radially or parallel to a radius, a region 5b, 6b at the height of the hinge axes 7, 8 and approximately in the direction of a connecting line between these hinge axes, and a region 5c, 6c which adjoins the region 5b, 6b, reaches into the recess 4 and forms the free end of the blocking bolts, 5, 6 facing the steering column.

In the blocking state, the region 5c or 6c is radially in engagement in the recess 4 and is drawn out of the recess 4 in an approximately radial direction. Especially at the height of the part circle T, this region 5c has the same width g as the protrusion 3, so that three regions 5c fit next to one another into one recess 4. The hinge axes 7, 8 protrude through the regions 5b and 6b respectively, this region being hinged to one hinge axis and the other hinge axis lying in a slot 5d or 6d respectively, these slots being curved in such a way and having such a length that they do not impede the movements of the blocking bolts 5, 6 but provide an additional supporting function on the particular hinge axis. The blocking bolts 5, 6, which cross in the region 5b and together form pliers or scissors, essentially differ from pliers or scissors only in that separate hinge axes are provided for each two-armed lever and that the regions 5c, 6c forming the jaws of the pliers do not strike each other but always form a distance d which, in the blocking state, is of the same size as the distance c of the sides Z, facing away from one another, of a protrusion and are thus equal to the width c of a protrusion or of the same size as the distance e of the sides Z, facing away from one another, of two protrusions 3, it being possible for one or more further protrusions also to lie between these two protrusions. Thus, the distance d between the mutually facing sides $S_3$, $S_4$ of the regions 5c, 6c can be expressed as follows:

$$d = x \cdot c + (x-1)b,$$

c being the width of a protrusion 3 and b being the width of a recess 4. This size of the distance d ensures that the two blocking regions of the blocking bolts 5, 6 can always engage around the sides of one or more protrusions 3.

Furthermore, it is important that the outer sides $S_1$, $S_2$ of the blocking regions 5c, 6c of the blocking bolts 5, 6 always come simultaneously into contact with the side faces Z of one, two or more recesses 4, it being presupposed again that both blocking bolts are in blocking engagement. Care must be taken here that the distance a between the sides $S_1$, $S_2$, facing away from one another, of the blocking regions 5c, 6c is equal to or smaller than the distance b, $b_1$, $b_2$ between the mutually facing side faces Z of two protrusions 3. Thus, the distance a must be of the following size, the regions 5c, 6c being able to engage in the same recess or in different recesses 4:

$$a = x \cdot b + (x-1)c.$$

In this equation, b is the width of a recess 4 and c is the width of a protrusion 3.

For optimum absorption of the forces applied by the protrusions 3 to the blocking bolts 5, 6 in the event of forcible rotation of the steering column, the faces $S_1$ to $S_4$ and Z are, in the blocking state, arranged radially or in planes in which the steering column axis lies. It is also ensured that a perpendicular N always intersects the hinge axis of a blocking bolt, this perpendicular being at right angles to a centre plane $M_S$, which extends centrally between the two sides of the blocking region of the particular blocking bolt and also contains the steering column axis. This also ensures that the foot of the perpendicular always lies at the point of intersection of the part circle of the protrusions 3 with the central plane $M_S$.

The two blocking bolts 5, 6 are each biased towards the blocking position by a spring 9, 10, so that these springs ensure that the two free ends of the blocking bolts approach one another. Due to these springs, the regions 5a, 6a of the two blocking bolts are, in the blocking position, in an arrangement approximately parallel to one another, the mutually facing sides of these regions being actuated by one or two eccenters 11, 12 or cams or one or two cam discs, in such a way that these eccenters located between the regions 5a, 6a force these regions apart and thus move the regions 5c, 6c from the blocking position into the free position. The eccenters 11, 12 are fixed, diametrically and parallel to the axis, to the end face of a circular disc 13 which is seated on an extension of the cylinder core of the lock. The blocking device including the steering column in the region of the blocking device is surrounded by a housing 14 which is made integral with the housing 15 of the cylinder lock. The extension 16 of the cylinder core protrudes through the circular disc 13 as far and into a switch 17.

Figure 2:
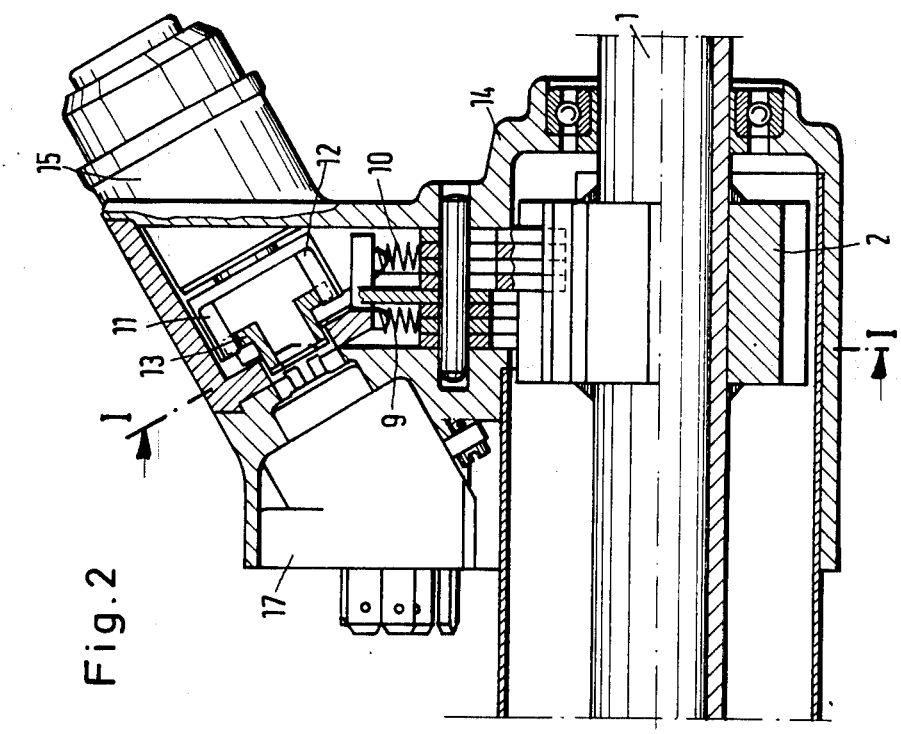
FIG. 2 shows a section along II—II in FIG. 1.
Figure 7:
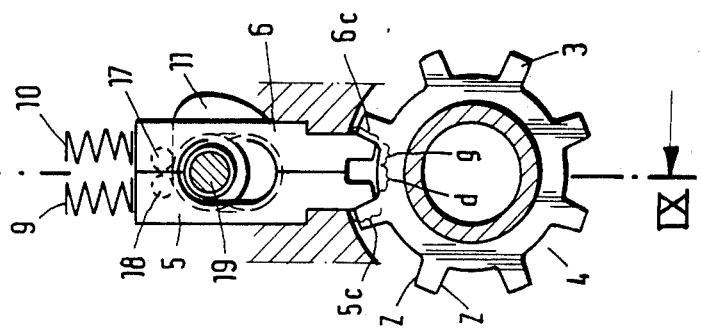
FIG. 7 shows a part cross-section through the steering column and blocking device of a second illustrative embodiment, with the blocking bolts in the blocking positions.
Figure 8:
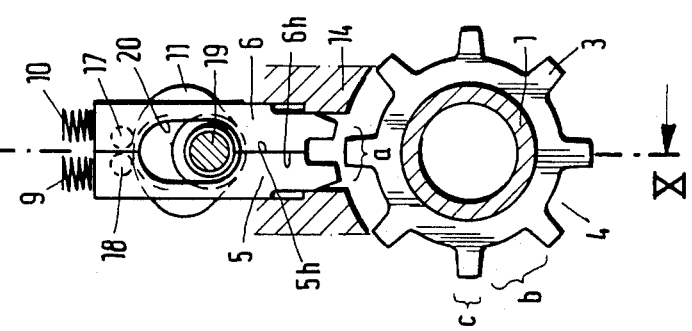
FIG. 8 shows a section according to FIG. 7, in the unblocked position.
Figure 9:
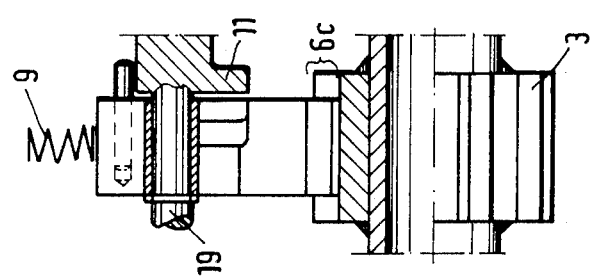
FIG. 9 shows a section along IX—IX in FIG. 7.
Figure 10:
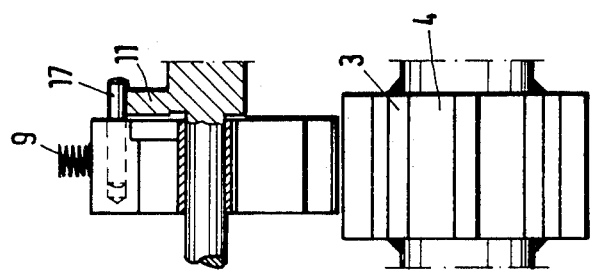
FIG. 10 shows a section along X—X in FIG. 8.

In the region of the elbow or at the height of the hinge axis, the outside of each blocking bolt 5, 6 bears against the inside of the housing 14, so that each lever is supported not only by the hinge axes by also by the housing against forces exerted by the protrusions 3 on the regions 5c, 6c. The lever-shaped blocking bolts 5, 6 can be punched from a single sheet metal part, the flat sides of these parts being at right angles to the steering column axis. A large absorption of force, coupled with very simple manufacture, is obtained when several punched sheet metal parts are combined into one blocking bolt, as shown in FIG. 2. Instead of two blocking bolts, it is also possible to arrange more than two blocking bolts around the steering column, the blocking bolts being actuated by the lock via control links, in particular control rings coaxial to the steering column.

Whereas the blocking bolts in the illustrative embodiment according to FIGS. 1 to 6 engage radially in the recesses in the steering column or in the bush 2, these can also engage axially, if the levers lie approximately parallel to the steering column, that is to say especially if, in the case of a pair of blocking bolts corresponding to the first illustrative embodiment, the centre axis of the pliers- or scissors-shaped blocking bolts lies parallel to the steering column close to the steering column next to the bush 2, so that the blocking regions 5c, 5d or the jaws or claws of the pliers or scissors engage with their end face in the recesses of the bush. This illustrative embodiment is not shown in the drawings.

The blocking device operates as follows: From their blocking position shown in FIGS. 5 or 6, the blocking bolts 5, 6 are pivoted into the release position, FIG. 3, by the eccenters 11, 12 when the cylinder core of the lock is turned with a key. In this position, the steering column with its bush 2 can move freely. When the eccenter disc 13 is turned by the key in the converse direction, the regions 5a, 6a are released, it being possible for three different blocking positions of the blocking bolt to result, depending on the position of the steering column. Corresponding to FIG. 5, the blocking regions 5c, 6c can lie in two different receses 4, their sides $S_1$, $S_2$ facing away from one another then securing the steering column against turning. In this case, the blocking regions have dropped into two adjoining recesses 4. In a position according to FIG. 6, the blocking regions can, however, also drop into two recesses 4, between which a further recess is located, the insides $S_3$, $S_4$ of the blocking regions then gripping around two protrusions 3 and bearing against the sides Z, facing away from one another, of these protrusions. In both blocking bolt positions, the steering column is fixed immovably, and a torque exerted on the steering column does not result in lifting-out of the blocking regions, since the latter can only radially be lifted out of the recesses 4 and the side faces or flanks of the blocking regions and of the protrusions lie parallel to this liftout direction, whilst a transmission of force takes place at right angles thereto.

In intermediate positions of the steering column, it can happen that one of the two regions 5c, 6c of the blocking bolts comes to lie on top of one of the protrusions 3 and can therefore not drop into a recess 4. In this rotary position of the steering column, however, the blocking region of the other blocking bolt can drop into a recess 4, since the distances or dimensions are selected such that one of the two blocking bolts always drops into a recess, FIG. 4. In this intermediate position, the steering column is slightly movable, a rotation of the steering column by a few degrees of angle having the result that the blocking bolt, which so far is not blocking, drops into a recess and the steering column is then immovably fixed. When the steering column in FIG. 4 is turned to the right, blocking takes place according to FIG. 6 and, with turning of the steering column to the left in FIG. 4, blocking takes place corresponding to FIG. 5.

The illustrative embodiment according to FIGS. 7 to 10 differs from the first only in that the blocking regions 5c, 6c are not formed by levers, but by bars 5, 6 which are movable longitudinally and bear against each other with two side faces 5h, 6h which are both arranged radially to the steering column 1. Between the blocking regions 5c, 6c, the bars have a distance d equivalent to the width c of a protrusion 3, and the outer blocking faces $S_1$, $S_2$, facing away from one another, of the blocking regions are at a mutual distance a which corresponds to the width b of the recess 4. Due to this choice of the dimensions and distances, either both blocking regions drop into a single recess 4, or the blocking regions of the blocking bolts grip around one protrusion 3. Again, intermediate positions are also possible, in which one of the two blocking bolts rests on the top of a protrusion.

The two blocking bolts are actuated by a single eccenter 11 which acts on pins 17, 18 which project laterally at right angles from the bars. A shaft 19 carrying the eccenter 11 passes through the bars which, for this purpose, form a central slot 20.

Figure 11:
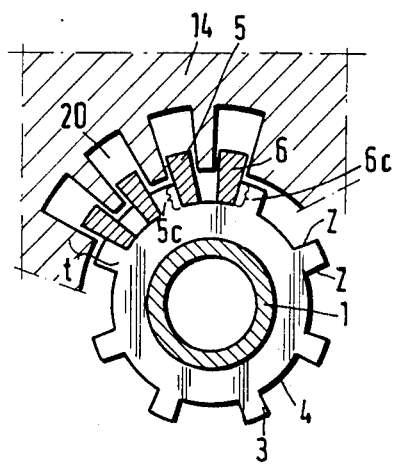
FIG. 11 shows a part cross-section through the steering column and blocking device of a third illustrative embodiment.
Figure 12:
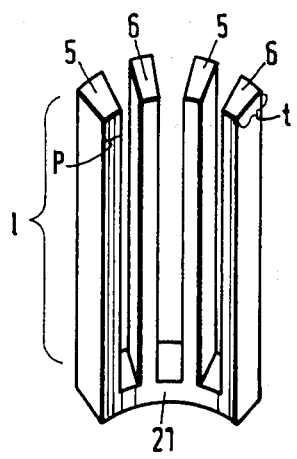
FIG. 12 shows a perspective representation of the blocking bolts used in FIG. 11.

The illustrative embodiment according to FIGS. 11 and 12 differs from the preceding ones in that the blocking bolts are formed by strips 5, 6 which are arranged in pairs, parallel to the axis of the steering column, next to the bush 2 having strip-shaped protrusions. The strips are spring-loaded or resilient towards the steering column 1, so that their blocking regions 5c, 6c facing the steering column drop into the recesses 4. The radial depth t of the strips is smaller than their length l, and the width p in the blocking region is smaller than the radial depth t and is equal to ⅓ of the width b of the recess 4 and equal to the width c of the protrusions 3. In the same way as in the other illustrative embodiments, the blocking regions 5c, 6c taper in the shape of a wedge towards the steering column, the wedge-shaped form also continuing, in the illustrative embodiment according to FIGS. 11 and 12, outside the blocking regions and the bars 5, 6 being guided in wedge-shaped recesses 20 in the housing 14 of the blocking device.

The bars or strips 5, 6 according to FIGS. 11, 12 are pivotable about an axis lying parallel to a tangent which contacts the bush 2 in the region of the strip. This pivot axis is thus at right angles to a prolonged radius of the steering column or bush, which radius runs centrally through the strip. The hinge axes can be arranged centrally between the two ends of the strip, so that only a part of the strip has a blocking action and the remaining part projects obliquely from the steering column or the bush for actuation of the strip. Alternatively, however, the pivot axis can also be arranged on one end of the strips, in which case the pivot axis can then also be formed by a ring sector 21 to which the strips 5, 6 are moulded. Since all the components can be moulded from plastic in all the illustrative embodiments, making the strips of plastic is particularly advantageous, since the ring sector 21 then also consists of plastic and can produce the spring action on the strips. By means of a mechanism not shown, the strips are pulled out of the blocking position radially through the lock against spring pressure. A ring, ring sector, pins or cables with a particularly small space requirement can be used as such a mechanism.

Figure 13:
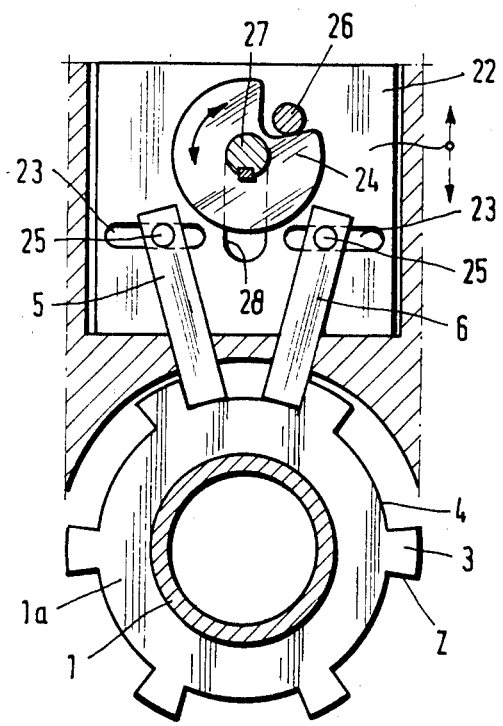
FIG. 13 shows a part cross-section through the steering column and blocking device of a fourth illustrative embodiment.

In the illustrative embodiment according to FIG. 13, the two blocking bolts are not directly adjacent but are arranged radially to the steering column at a mututal distance so that, when forces are exerted by the steering column or by the side faces Z on the blocking bolts, no forces are generated which could move the blocking bolts out of their blocking position. At their outer ends, the two blocking bolts 5, 6 have lateral protrusions 25 which are located in slot-type recesses 23 in a slotted link 22, arranged at right angles to the steering column for actuation by this slotted link. On one side face, the slotted link 22 has a rectangular pin 26 which is actuated by a cam disc 24 fixed solidly to a shaft 27. When the shaft 27 is rotated, the slotted link 22 is moved away from the steering column 1, and the blocking bolts 5, 6 are thus moved from the blocking position shown in FIG. 13 into a non-blocking position. The shaft 27 rests in a slot 28 of the slotted link 22, and the pin 26, shaft 27 and also the protrusions 25 are parallel to the axis of the steering column.

Figure 14:
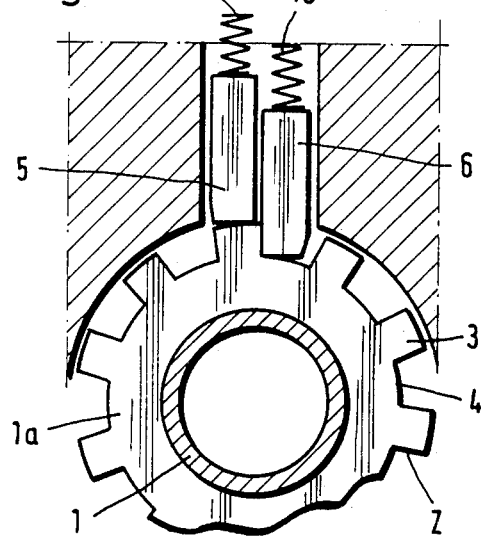
FIG. 14 shows a part cross-section through the steering column and blocking device of a fifth illustrative embodiment.

The illustrative embodiment shown in FIG. 14 essentially differs from that according to FIGS. 7 to 10 in that the recesses 4 in the steering column or in the tooth-shaped component 1a fixed to the steering column have a width which is smaller than the total width of the two blocking bolts 5, 6. This does not ensure with absolute certainty that, in each position of the steering column, one blocking bolt has dropped into one of the recesses 4, but the probability is substantially higher than in the case of one single blocking bolt.

I claim:

1. Device for blocking the rotary movement of a steering column (1) in a motor vehicle comprising:
    a steering column (1);
    a blocking bolt (5) which is actuated by a lock and in the blocking position engages in a recess (4) in the steering column;
    at least one further blocking bolt (6) which can be actuated by the same lock and, like the first blocking bolt (5), in the blocking position engages in recesses (4) arranged at regular spacings around the periphery of the steering column;
    protrusions (3) formed from material located between the recesses (4) having side faces (Z) for blocking the blocking bolts (5, 6); and
    wherein the blocking bolts (5, 6) are arranged on only one side of the steering column (1) within no more than a 90° angle sector of the steering column.

2. Device according to claim 1, characterized in that the recesses (4) in the steering column (1) are grooves parallel to the axis and the protrusions (3), located in between, are ribs or teeth parallel to the axis.

3. Device according to claim 2 having blocking regions (5c, 6c), characterized in that the distance (d) between the mutually facing sides ($S_3$, $S_4$) of the two blocking bolts (5, 6) is, in the blocking regions (5c, 6c) at least as large as the distance (c, e) between the sides (Z) facing away from one another, of at least one protrusion (3).

4. Device according to claim 3, characterized in that, in the case of a blocking action by two protrusions (3) at least one further protrusion (3) lie between these.

5. Device according to claim 2, characterised in that the distance (d) between the mutually facing sides ($S_3$, $S_4$) of the two blocking bolts (5, 6) is, in the blocking regions (5c, 6c), at least as large as x times the width (c) of one protrusion plus x-1 times the width (b) of a recess.

6. Device according to claim 1 having blocking regions (5c, 6c), characterized in that the distance (a) between the sides, facing away from one another, of the two blocking bolts (5, 6) is, in the blocking regions (5c, 6c) at least as large as the width (b) of a recess (4).

7. Device according to claim 6, characterized in that the distance (a) of the sides ($S_1$, $S_2$), facing away from one another, of the two blocking bolts (5, 6) is no larger than the distance (b, $b_1$, $b_2$) of the mutually facing side faces (Z) of two protrusions (3).

8. Device according to claim 7, characterized in that at least one protrusion is located between those protrusions (3) the mutually facing sides faces ($S_3$, $S_4$) of which have a blocking action.

9. Device according to claim 7, characterized in that the distance (a) between the sides ($S_1$, $S_2$), facing away from one another, of the two blocking bolts (5, 6) is not larger than x times the width (b) of one recess plus x-1 times the width (c) of a protrusion.

10. Device according to claim 1, characterized in that the blocking region (5c, 6c) of each blocking bolt (5, 6) has a width (g) which is approximately the same as the width (c) of each protrusion (3), and that the width (b) of each recess (4) is approximately equal to three times the width (c) of a protrusion.

11. Device according to claim 1, characterized in that more than two blocking bolts (5, 6) are provided which engage in the recesses (4) in the steering column (1).

12. Device according to claim 1, characterized in that the recesses (4) and protrusions (3) of the steering column (1) are formed by a ring or sleeve (2) fixed to the steering column.

13. Device according to claim 1, characterized in that the blocking bolts (5, 6) penetrating into the recesses (4) in the steering column (1) are formed by bars.

14. Device according to claim 13, characterized in that the bars (5, 6) perpendicularly displaceable from the steering column (1) are mounted radially to the steering column (1) and engage between protrusions (3) projecting from the steering column.

15. Device according to claim 13, characterized in that the bars (5, 6) perpendicularly displaceable from the steering column (1) mounted close to the steering column (1) and parallel to the axis thereof.

16. Device according to claim 15, characterized in that the bars (5, 6), parallel to the axis, engage in recesses (4) on the end face of a sleeve (2) or ring fixed to the steering column (1).

17. Device according to claim 15, characterized in that a sleeve (2) or ring fixed to the steering column (1) has, as the recesses (4), orifices which penetrate the sleeve or ring parallel to the axis and through which the bars (5, 6) can be pushed.

18. Device according to claim 13, characterized in that the bars (5, 6) form, only in the blocking regions (5c, 6c), a distance (d) between them of at least the width (c) of one protrusion (3) and are in mutual contact over at least a major part of the remaining length.

19. Device according to claim 1, characterized in that the blocking bolts (5, 6) can be actuated from the lock via at least one eccenter (11, 12) component.

20. Device according to claim 13, characterized in that pins (17, 18) which can be subjected to the action of an eccenter (11) component project at right angles from the bars.

* * * * *